United States Patent [19]

Milton, Jr.

[11] Patent Number: 5,640,694
[45] Date of Patent: Jun. 17, 1997

[54] INTEGRATED RF SYSTEM WITH SEGMENTED FREQUENCY CONVERSION

[75] Inventor: Curtis E. Milton, Jr., Glen Burnie, Md.

[73] Assignee: Northrop Grumman Corporation, Los Angeles, Calif.

[21] Appl. No.: 434,420

[22] Filed: May 3, 1995

[51] Int. Cl.$^6$ .................................................. H04B 1/16
[52] U.S. Cl. .................. 455/133; 455/143; 455/190.1; 455/266; 342/57
[58] Field of Search ..................................... 455/132, 133, 455/143, 180.1, 188.1, 189.1, 190.1, 191.1, 200.1, 266, 275, 293; 342/13, 57

[56] References Cited

U.S. PATENT DOCUMENTS

| | | | |
|---|---|---|---|
| 5,010,400 | 4/1991 | Oto | 455/189.1 X |
| 5,068,918 | 11/1991 | Verheijen et al. | 455/191.1 X |
| 5,280,636 | 1/1994 | Kelley et al. | 455/180.1 X |

*Primary Examiner*—Chi H. Pham
*Attorney, Agent, or Firm*—Walter G. Sutcliff

[57] ABSTRACT

An integrated RF avionics system having a common IF interface for diverse functions, such as radar, electronic waveform(EW) and communications/navigation/identification(CNI). The interface uses a segmented band of IF frequencies which are subdivided into two or more individual band segments separated by a guard band segment. The lower frequency band segment comprises a narrow band segment which is assigned to radar functions while the other or upper band segment comprises a wideband segment assigned to other functions such as EW and CNI functions. The guard band is not used for signal transmission, but is left unused to permit bandpass filters to reject signals in the adjacent unwanted segment, thus achieving frequency separation across the IF band while allowing the use of common hardware. The total IF range is sufficiently wide that radar, EW and CNI signals can be separated from each other with practical filters while being routed through a common IF switch network. Signals from various types of antennas are routed through an RF switch network to a bank of frequency converters for converting the RF signals to an IF frequency within the IF band.

18 Claims, 7 Drawing Sheets

INTEGRATED RF SYSTEM WITH SEGMENTED FREQUENCY CONVERSION

BACKGROUND OF THE INVENTION

1. Field of the Invention

This invention relates generally to RF systems which perform radar, electronic warfare, and communication/navigation/identification functions and, more particularly, to integrated avionic type RF systems which perform such functions using common hardware.

2. Description of the Prior Art

Current RF avionics systems for performing radar, electronic warfare(EW) and communications/navigation/identification(CNI) functions are typically comprised of multiple systems segregated by their individual functions. In such systems, any one system performs only a few functions, such as landing an aircraft or performing electronic countermeasures. More recently, however, the state of the art has moved toward system integration where all tactical RF avionics are included in three distinct functional systems, namely radar, EW, and CNI. Integration has concentrated within the distinct boundaries of these three specific functions.

Each of the aforementioned systems has its own means of implementing receiver and exciter resources and employ respective superhetrodyne frequency conversions to a common intermediate frequency(IF), thereby enabling common receivers and exciters to be used over a wide frequency range. Design of this hardware requires optimization of IF frequency selections to maximize performance with conventional components. However, the differing requirements of each of the three systems has resulted in different choices for their IF frequency conversion implementations.

Within an integrated RF avionic system, the key receive resources are frequency converters and IF receivers. The ability to share these resources permits dynamic reconfiguration to increase the available quantity and provide fault tolerance. Sharing common receive resources permits functions to be supported that require large number of simultaneous receive channels such as monopulse tracking, adaptive antenna pattern control, and passive direction finding. In stand-alone systems, these functions may not be available due to the size, weight and cost. Using common resources also reduces the number of individual unique modules, thus reducing development cost and enhancing supportability. To enable the sharing of frequency converters in IF receivers, a common IF interface along with appropriate RF and IF switches are essential. However, a common first IF frequency, although beneficial from the standpoint of an integrated RF avionics system, presents two major obstacles, namely: (1) ideal frequency selections are diametrically opposing; and (2) a common IF aggravates the need for high signal isolation. Accordingly, all integrated RF sensor systems present key obstacles that must be addressed. The various functions have differing requirements which include: frequency coverage, instantaneous bandwidth and dynamic range.

Prior attempts in addressing this challenge have concentrated on two methods of integration, namely (1) converting all signals to a common IF frequency, or (2) using separate frequency conversion resources with separate IF signal channels.

Converting all signals to a common IF frequency provides the simplest solution in terms of interconnection between modules because then a single IF port can be used to interface the various modules. These interfaces are implemented by switch networks which reconfigure the system for various functions. However, a common IF frequency selection involves some compromise in performance, particularly where radar and EW functions are integrated. Unfortunately, radar and EW introduce diametrically opposing requirements that inhibit selection of a suitable common IF. This is because the driving factor for IF selection for EW functions is providing wide instantaneous bandwidth. This requires a relatively high IF frequency. A sufficiently high IF band is selected for EW functions in order to avoid generation of signal harmonics within the band extent which may be misinterpreted as real emitters by the receiver circuitry. On the other hand, the driving factor for radar IF selection is minimizing spurious generation by mixers. This is accomplished by maintaining a sufficiently high ratio between the RF and IF frequencies. Accordingly, in order to avoid low order spurious responses, a relatively low IF frequency is required.

Because common first IF frequency selection requirements for EW and radar are diametrically opposing, their integration into common hardware is difficult since, as noted above, radar functions demand a relatively low IF, while the EW functions demand a relatively high IF. The use of separate frequency conversion resources to optimize performance of individual functions circumvents the loss of performance due to a compromised IF. Converting all signals to a common IF, however, introduces a new challenge of providing sufficient isolation so as to eliminate cross-talk between functions.

Furthermore, as system resources are placed into a common rack and shared between functions, there are several paths for cross-talk when all functions use the same IF. These typically include: leakage between RF connectors, leakage onto power and control signals, and finite isolation of switch networks employed in reconfiguring system resources. Radar reception requires very high instantaneous dynamic range to detect small targets in the presence of strong ground clutter. EW signals can be quite strong in amplitude, since they only incur a one-way propagation loss. The result is the need to achieve a very high signal isolation on the order of 80–100 dB when considering typical tactical requirements and thus presents an additional challenge to integrated sensor systems design.

Notwithstanding the inherent problems involved, emerging RF avionic system designs are pressing forward with integrated systems which will perform radar, EW and CNI functions which can share hardware resources. Such integrated designs enable receiver and exciter resources to be dynamically assigned to avionics functions based on flight and tactical mission needs. Advances in wideband RF technology and electronically scanned array antennas encourage full integration of their RF sensor resources. The benefit of an integrated RF system is that a limited number of resources can be made available to perform any function desired.

SUMMARY

Accordingly, it is an object of the present invention to provide an improvement in the integration of diverse types of RF electronics systems.

It is another object of the invention to provide an improvement in integrated RF avionics systems which perform radar, electronic warfare, and communications/navigation/identification functions while sharing common hardware.

It is a further object of the invention to provide an integrated RF avionic system which enable the sharing of frequency converters and RF receivers by a common IF interface while achieving desired isolation and minimum spurious frequency generation.

The foregoing and other objects are achieved by an implementation which includes a common IF frequency interface in an integrated RF avionics system providing radar, electronic warfare(EW) and communications/navigation/identification(CNI) functions. Instead of using a single common IF frequency, the interface in accordance with this invention uses a segmented band of IF frequencies which are subdivided into two or more individual band segments separated by a guard band segment, where the lower frequency band segment comprises a narrow band segment which is assigned to radar functions supporting very high spur-free dynamic range operation while the other or upper band segment comprises a wideband segment assigned to other functions such as EW and CNI functions requiring lower spur-free dynamic range operation. The guard band is not used for signal transmission, but is left unused to permit bandpass filters to reject signals in the adjacent unwanted segment. This achieves frequency separation across an IF band while allowing the use of common hardware. The total IF range is sufficiently wide that radar, EW and CNI signals can be separated from each other with practical filters while being routed through a common IF switch network. Signals from various types of antennas are routed through an RF switch network to a bank of frequency converters for converting the RF signals to an IF frequency within the IF band. While the inventive concept of this invention is particularly directed to segmented IF band conversion for received signals, the same concept is applicable to the transmission of RF signals.

BRIEF DESCRIPTION OF THE DRAWINGS

The following detailed description of the invention will be more readily understood when considered together with the accompanying drawings wherein.

DETAILED DESCRIPTION OF THE INVENTION

Before considering the preferred embodiment of the invention, it should again be noted that integrated RF sensor systems implementing radar, electronic warfare (EW) and communications/navigation/identification (CNI) functions encounter several inherent problems that must be overcome due to the fact that the various functions have differing requirements which include: frequency coverage, instantaneous bandwidth and dynamic range. As noted above, prior art attempts addressed to these obstacles have generally concentrated on two methods of integration: (1) converting all signals to a common IF frequency; or (2) using separate frequency conversion resources with separate IF frequencies.

Figure 1:
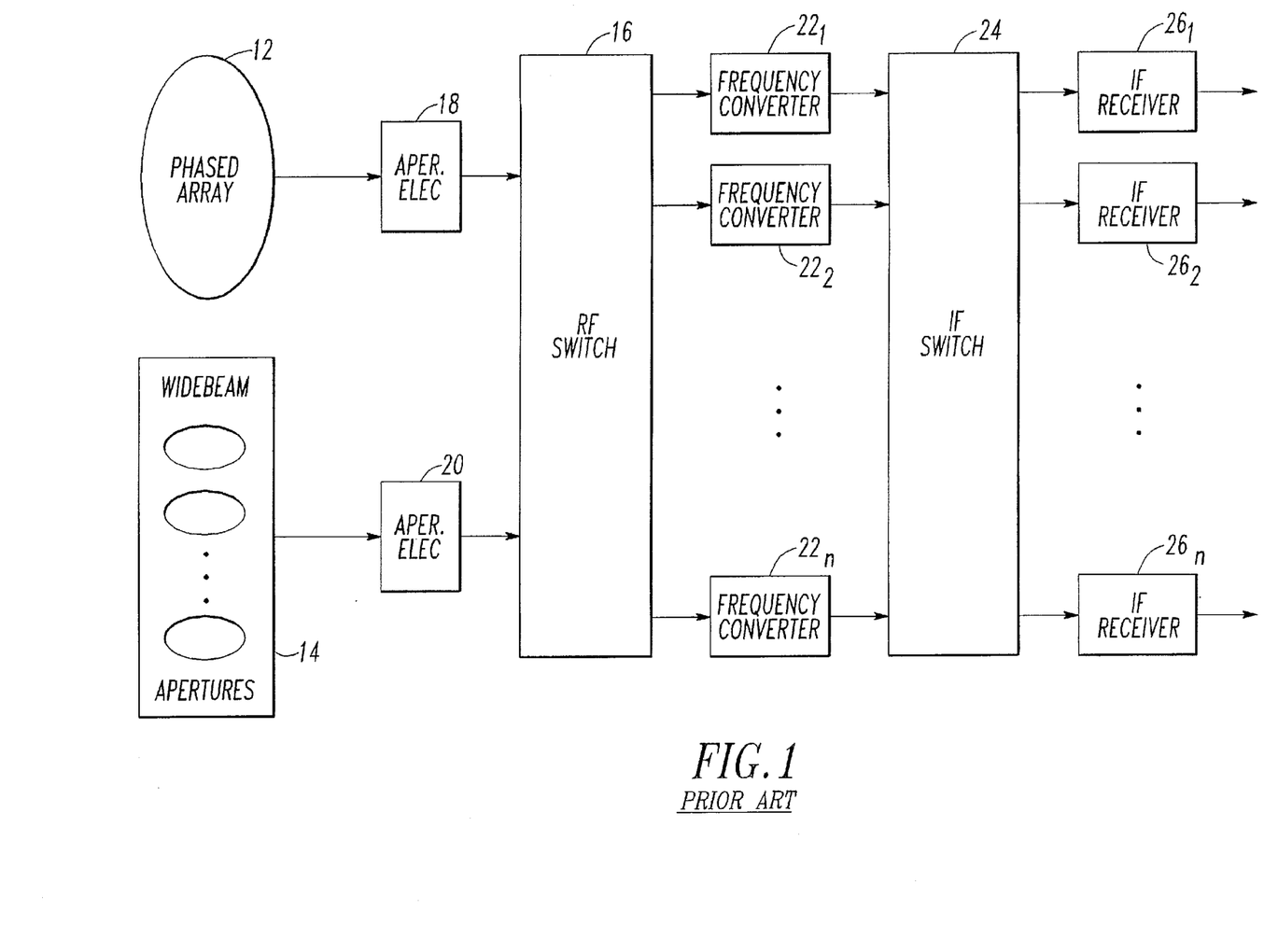
FIG. 1 is an electrical block diagram generally illustrative of a conventional type of integrated type of RF avionic system which converts all RF signals to a common IF.

Converting all signals to a common IF frequency provides the simplest solution in terms of interconnection between modules because a single IF port can be used to interface the various modules. These interfaces are performed through switch networks which operate to reconfigure the system as required for various functions. As illustrated in FIG. 1, for example, reference numeral 12 denotes a phased array antenna system, while reference numeral 14 denotes a plurality of selectively positioned wideband RF apertures. Both sets of these elements are adapted to implement radar, electronic warfare(EW) and communications/navigation/identification(CNI) functions. Further as shown, the phased array antenna 12 and the wideband apertures 14 are coupled to an RF switch network 16 through conventional RF aperture circuitry 18 and 20. The RF switch network 16 couples to a set of frequency converters $22_1, 22_2 \ldots 22_n$ which respectively couple to an IF switch network 24 which in turn is coupled to a plurality of IF receivers $26_1, 26_2 \ldots 26_n$ used for designated functions, e.g. radar, EW, etc.

In the configuration shown in FIG. 1, the frequency converters $22_1 \ldots 22_n$ and the IF receivers $26_1 \ldots 16_n$ are shared through selective switching of the RF switch network 16 and the IF switch network 24 so as to permit the use of a common IF interface. The obvious advantages of a common IF approach are, among other things, the need for minimum hardware, a minimum number of module types, and a maximum reconfiguration capability. However, a major concern is providing adequate signal isolation between radar and EW functions. Radar reception requires very high instantaneous dynamic range to detect small targets in the presence of strong ground clutter. EW signals, on the other hand, can be quite strong since they are subjected only to a one-way propagation loss. The result is a need to achieve very high signal isolation. Converting all signals to a common IF presents an additional challenge to integrated sensor system design, because of the need to avoid cross talk between functions. Both routing signals through common switch circuitry and leakage between connectors presents paths for self-interference within an integrated sensor system using a common IF.

Also, the common IF approach involves a compromise in performance where radar and EW functions are involved. This is due to the fact that radar and EW impose diametrically opposing requirements that inhibit selection of a suitable common IF frequency since IF selection for EW functions require wide instantaneous bandwidth which dictates a relatively high IF, while for radar applications, IF selection is based upon minimizing spurious frequency generation by the various mixes involved and is accomplished by maintaining a sufficiently high ratio between the RF and IF by utilizing a relatively low IF frequency.

Figure 2:
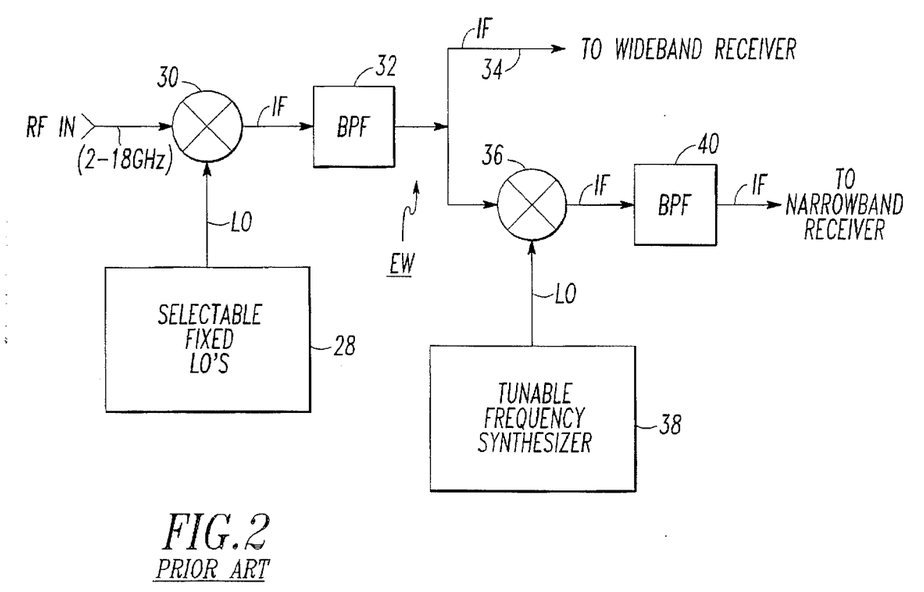
FIG. 2 is an electrical block diagram broadly illustrative of a known prior art frequency converter for an RF avionic system including an electronic warfare capability and utilizing separate IF frequencies.
Figure 3:
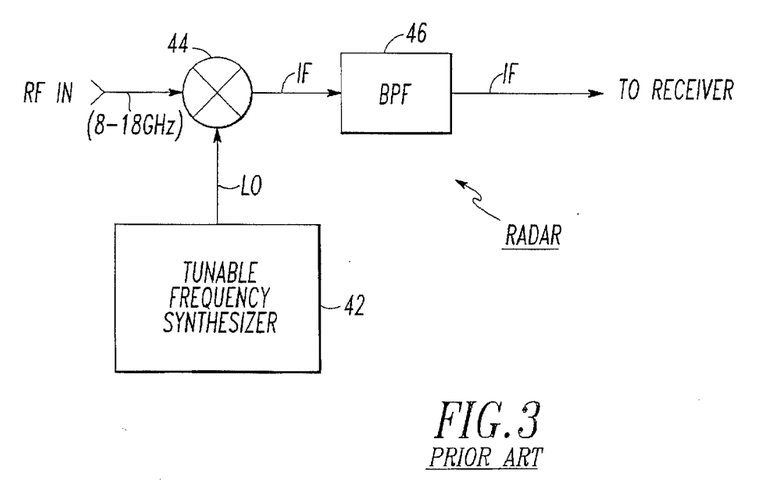
FIG. 3 is a block diagram broadly illustrative of a known prior art frequency converter for an RF avionic system including a radar capability and also using one or more IF frequencies.

Because of these diverse requirements, the system designers in the past have taken a seemingly logical approach and resorted to using separate IF circuitry for EW and radar functions as shown, for example, in FIGS. 2 and 3. FIG. 2 is illustrative of a conventional frequency converter for EW functions which covers a wide RF frequency range, typically between 2 and 18 GHz. In such a system, the RF band is broken into sub-bands which are block down-converted to a common IF via multiple selectable fixed local oscillators shown by reference numeral 28 which are coupled to a common signal mixer 30 with the output thereof being fed to a bandpass filter 32. An appropriate fixed frequency local oscillator is selected for each sub-band which when fed through the bandpass filter 32, can be routed either to a wideband receiver, not shown via signal path 34 for rapid signal acquisition or to a second mixer 36 which is coupled to second level oscillator 38. Such a wideband receiver coupled to the signal path 34 may cover the entire IF band or, in typical practice, apply frequency selective elements to receive a portion of this IF band at any one time to reduce the number of incoming signals to a level that can be acceptably processed. When the first IF band output from the mixer 30 is routed to a subsequent frequency conversion stage including the mixer 36 and tunable local oscillator 38 comprised of, for example, a synthesizer shown, a second IF output is generated, which is coupled to a narrow band receiver, not shown, via a bandpass filter 40.

A relatively high IF band is selected for the configuration shown in FIG. 2 for EW functions to avoid generation of signal harmonics within the selected band, which may be misinterpreted as real emitters by the receiver circuitry coupled thereto. Selection of an IF band, which is less than an octave in extent, eliminates generation of in-band harmonics. For example, to support 2 GHz of instantaneous bandwidth, the lower limit of the IF band should be sufficiently greater than 2 GHz to allow filtering of the harmonic response from the signal pass band. In the example shown in FIG. 2, an IF band of 4 to 6 GHz is typically selected to provide required instantaneous bandwidths while being able to reject in-band harmonics with realizable filters such as shown by reference numerals 32 and 40.

As noted above, in opposition to the requirements for EW, the driving factor for radar IF selection is minimizing spurious frequency generation by the signal mixers utilized and is accomplished by maintaining a sufficiently high ratio between the RF and IF. Current practice for a separate IF conversion for radar applications is shown in FIG. 3 where a separate tunable local oscillator 42 comprising, for example, a frequency synthesizer is coupled to a signal mixer 44 which additionally receives an RF signal input in the range of 8–18 GHz. The output of the mixer 44 is an IF frequency below 2.5 GHz which is fed to receiver apparatus, not shown, through a bandpass filter 46 so as to maintain a relatively high ratio between the RF and IF frequencies. This is due to the fact that spurious signals appear to the radar system as false targets which interfere with the objectives of the system to locate and track actual targets of interest.

Figure 4:
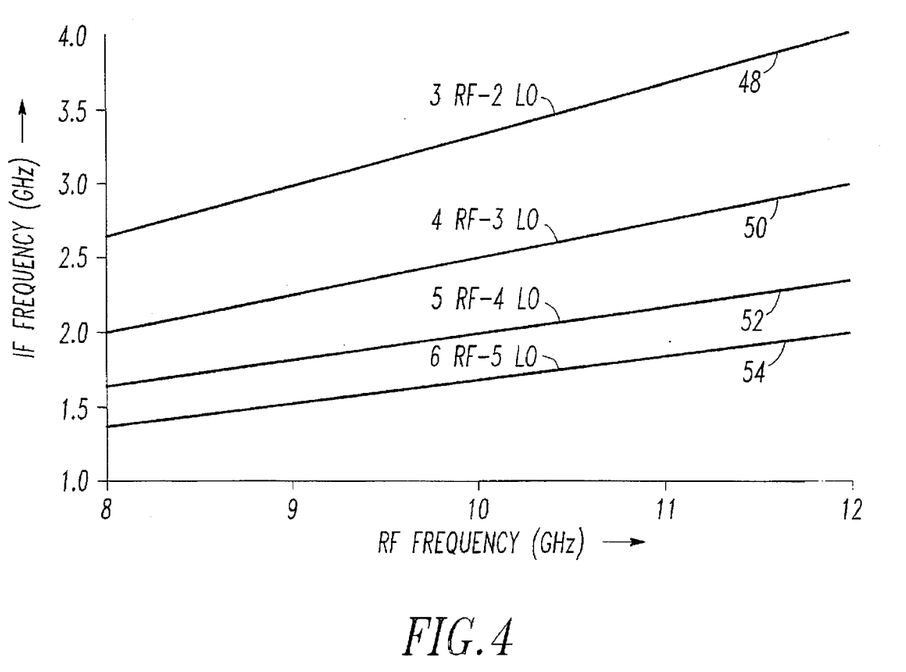
FIG. 4 is a graphical illustration of the location of undesired spurious frequencies as a function of RF and IF frequencies.

FIG. 4 depicts four graphs 48, 50, 52 and 54 which relate the orders of spurious signal frequencies involved with frequency conversion as it relates to the RF and IF frequencies utilized. Graph 48, for example, denotes the location of spurious frequencies for the relationship of 3 times the RF frequency(RF) minus 2 times the local oscillator frequency (LO). In state-of-the-art signal mixers, the low order spurious frequencies typically occur with the highest level amplitudes and hence are more troublesome. Thus, to avoid low order spurious responses, a relatively low IF below 2.5 GHz is required.

For radar functions, therefore, an appropriate narrow band IF is selected to avoid significant spurious signals over the desired RF operating band. For the majority of radar functions, the IF band is narrow, needing only enough bandwidth to pass the radar return from the transmitted signal waveform with its Doppler velocity offset. Typically, the IF band selection is centered at 1.8 GHz for a configuration shown in FIG. 3, with a representative bandwidth of 100 to 200 MHz. Tuning across the covered RF range is accomplished using the tunable frequency synthesizer 42 which also determines the transmitted radar frequency, i.e. the RF which is input to the mixer 44.

The IF selection requirements for EW and radar being diametrically opposing tend to inhibit their integration into common hardware since the radar functions demand an IF sufficiently below 2.5 GHz, while the EW functions demand an IF band sufficiently higher to attain needed instantaneous bandwidth. The use of separate frequency conversion resources to optimize performance of individual functions as shown in FIGS. 2 and 3, circumvents the loss of performance due to a compromised IF which is required for a system arrangement as shown in FIG. 1.

Accordingly, the known prior art of RF system designs lack an optimum type means for successful integration of radar, EW and CNI functions into a common system without over specialization of hardware or compromise in performance.

The foregoing description of prior art practice now leads to a detailed description of the inventive concept of this invention and its implementation. The key feature of this invention is the use of a common intermediate frequency(IF) interface having a segmented IF frequency band as shown, for example, in FIG. 5, and which is subdivided into at least two individual band segments. The result is a simple IF interface band permitting signals to share common hardware while being reconfigurable by switch networks in a manner heretofore described with respect to FIG. 1 and being transparent to the interfaces between the individual system components.

In avionics systems, a typical X-Band radar includes a forward looking antenna array, in this example covering 8–14 GHz to provide effective air-to-air and air-to-ground capability. EW and CNI functions may occur anywhere within the 0.5–18 GHz band through a number of diverse antennas deployed about the aircraft system platform.

The common IF interface according to the subject invention enables a highly integrated RF system to be realized which overcomes the limitations of the prior art. The embodiment of the invention which will now be described achieves frequency separation across an IF band of 2.2 GHz–5.0 GHz while enabling common hardware to be employed for radar, EW and CNI functions.

Figure 6:
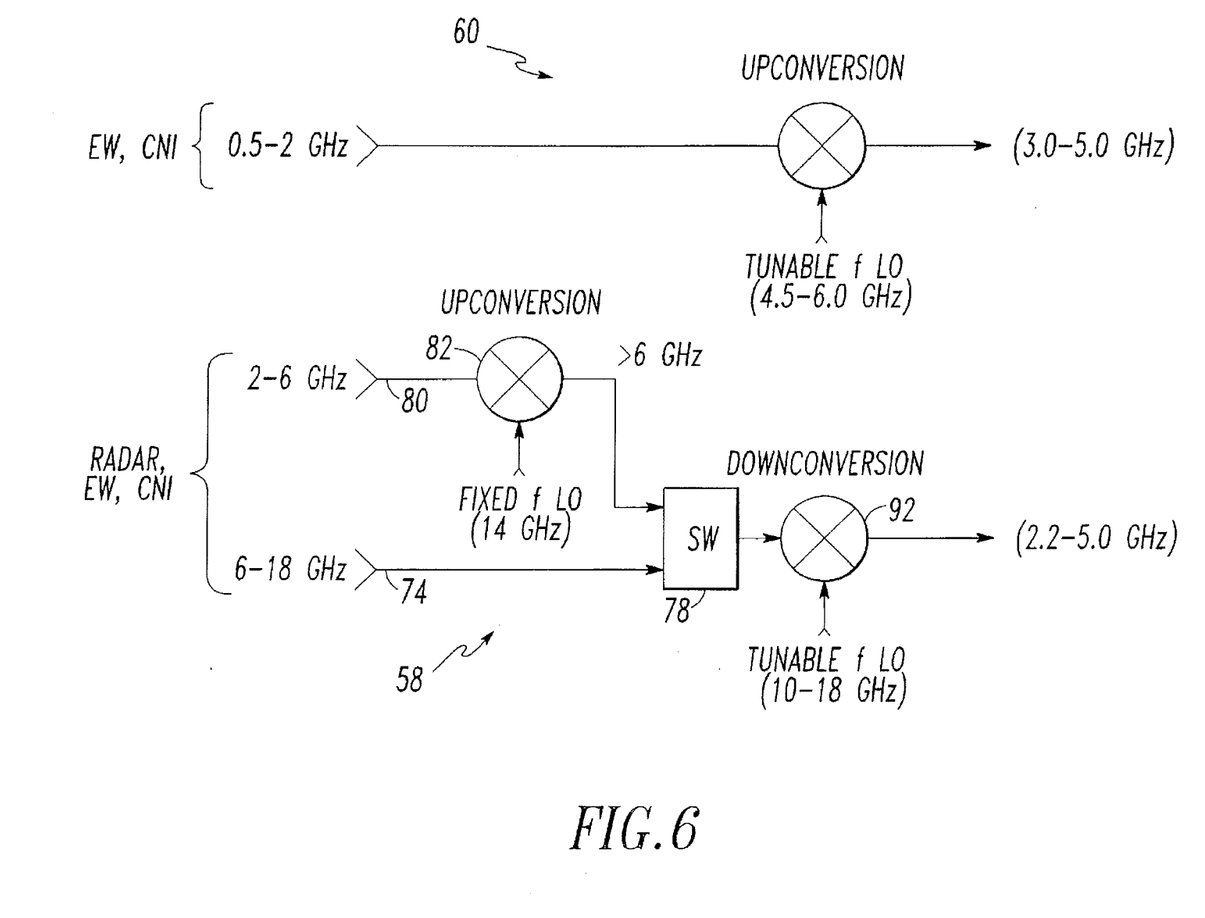
FIG. 6 is an electrical block diagram broadly illustrative of the frequency conversion scheme for using a segmented IF band such as shown in FIG. 5.

In its simplest form, IF conversion from RF is accomplished in accordance with the scheme shown in FIG. 6, where, for example, EW and CNI signals in the range from 0.5–2 GHz are upconverted by being mixed with a tunable frequency local oscillator signal in the range of 4.5–6.0 GHz to provide an IF output in the range between 3.0 GHz and 5.0 GHz.

With respect to RF signals in the range between 2 GHz and 18 GHz which encompass both radar and EW, CNI signals, these RF signals are first upconverted by being mixed with a fixed local oscillator signal having a frequency of, for example, 14 GHz wherein a first or intermediate IF signal greater than 6 GHz is provided. This first IF signal is then downconverted by means of a tunable or variable frequency local oscillator signal having a range of 10–18 GHz to provide an IF output in the range between 2.2 GHz and 5.0 GHz.

RF signals in the range between 6–18 GHz are simply downconverted by means of the variable frequency local oscillator signal of 10–18 GHz used for converting the 2–6 GHz to again provide an IF output in the range between 2.2 GHz and 5.0 GHz.

Figure 7:
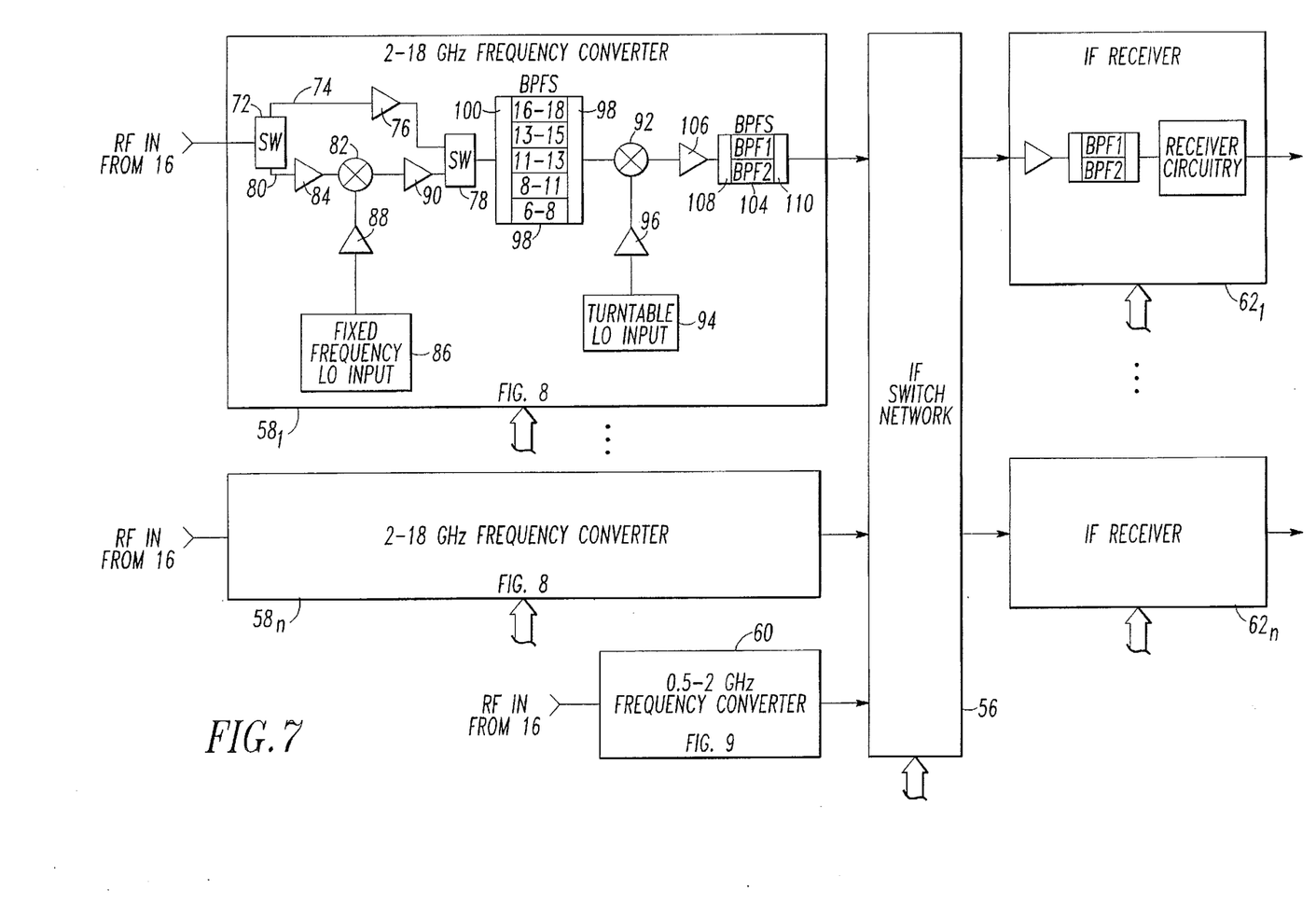
FIG. 7 is a block diagram generally illustrative of the preferred embodiment of the invention.
Figure 8:
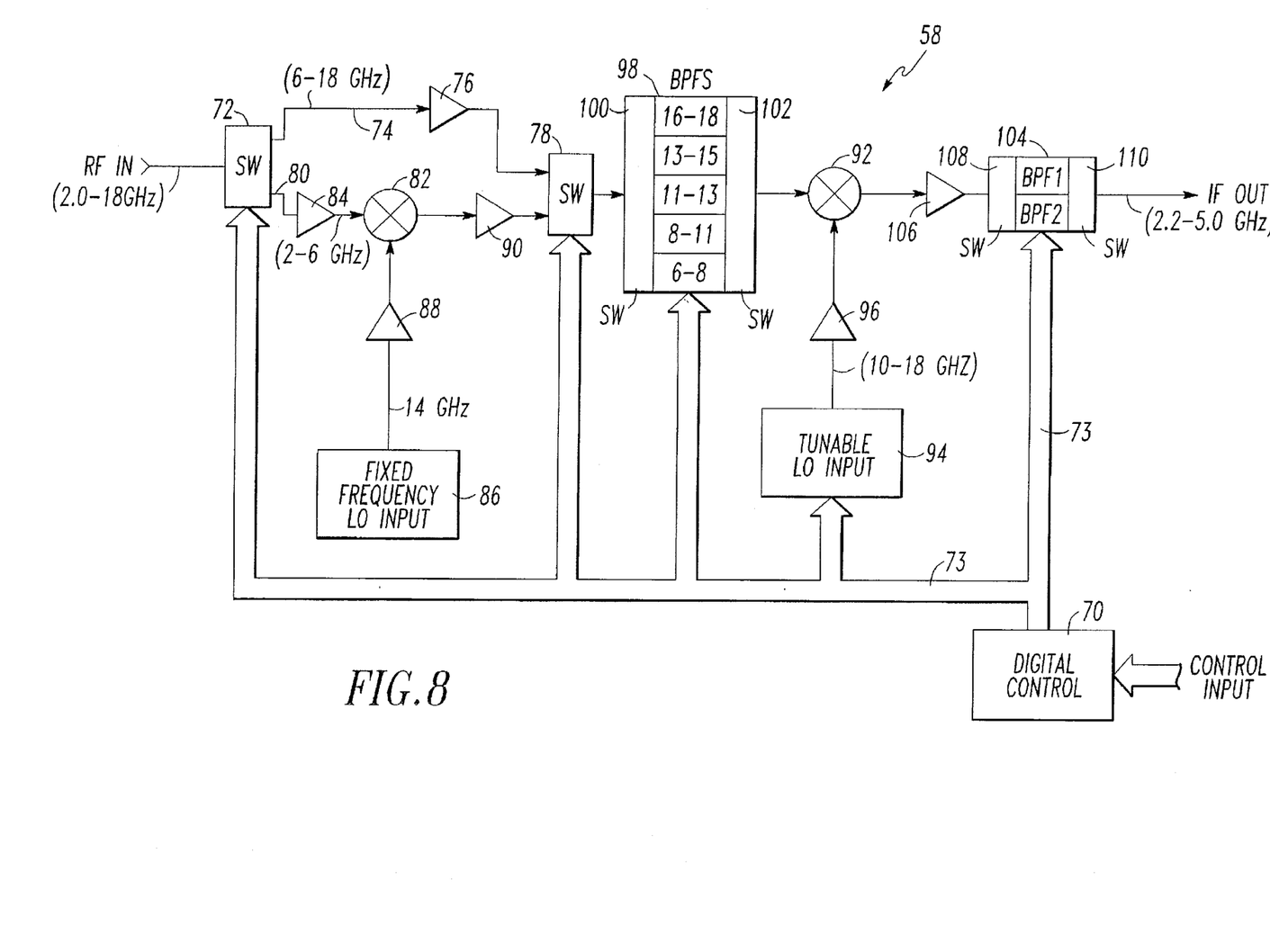
FIG. 8 is an electrical block diagram illustrative of one type of frequency converter utilized in the embodiment shown in FIG. 7.
Figure 9:
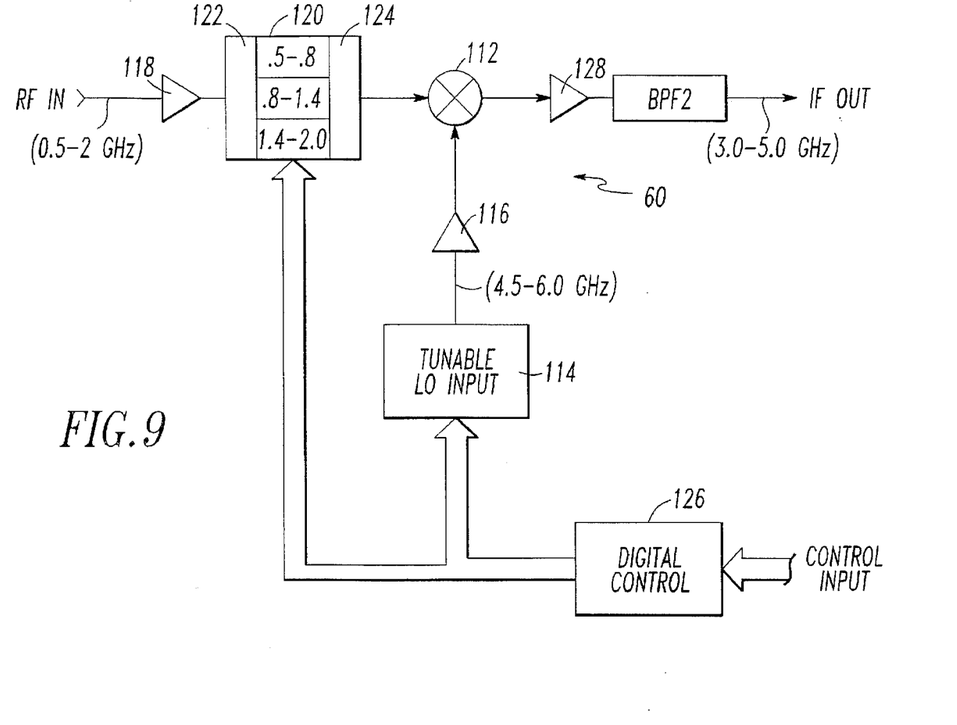
FIG. 9 is an electrical block diagram illustrative of a second type of frequency converter utilized in the embodiment shown in FIG. 7.

Apparatus for implementing these frequency conversions are shown in FIGS. 7, 8 and 9. Considering first FIG. 7, RF signals from the various antennas, such as shown in FIG. 1, are routed through an RF switch network typically the network 16 as shown in FIG. 1. An improved bank of frequency converters are coupled to the RF switch network and include a plurality of 2–18 GHz frequency converters $58_1 \ldots 58_n$, the details of which are shown in FIG. 8, and at least one 0.5–2 GHz frequency converter 60, the details of which are shown in FIG. 9. Further as shown in FIG. 7, the IF switch network 56 couples to a plurality of IF receivers $62_1 \ldots 62_n$, with the IF switch network 56 acting to reconfigure the system for the operational mode required.

Figure 5:
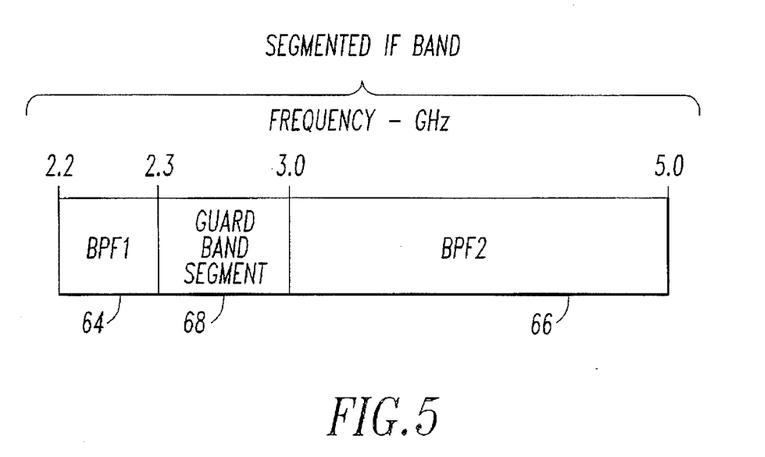
FIG. 5 is a diagram illustrative of the IF frequencies utilized in the segmented IF frequency band in accordance with the subject invention.

Before considering the details of the converters 58 and 60, it should be noted that the IF interface band, as shown in FIG. 5, is sub-divided into two IF band segments, a narrow 100 MHz band segment 64 which covers the frequency range of 2.2 to 2.3 GHz and a wide 2.0 GHz band segment 66 which covers the frequency between 3.0 and 5.0 GHz. A guard band segment 68 having a bandwidth of 700 MHz is provided between the band segments 64 and 66. The band segments 64 and 66, while being assignable to specific functions which share common hardware, the particular IF band segment is assigned to optimize the performance of the specific function with which it is utilized.

Thus, functions which require low spurious levels are assigned to the lower narrow bandwidth IF band segment 64 thereby eliminating the presence of mixer spurious products of low order. Functions which require wide instantaneous bandwidth are assigned the IF band segment 66 thereby providing greater available bandwidth which is less than an octave in extent. Accordingly, the lower narrow band segment 64 is assigned to the radar function, while the upper wide band segment 66 is assigned to EW and CNI functions requiring low spur-free dynamic range. This segment being higher in frequency provides wide available instantaneous bandwidth to support these latter functions. In this invention, the particular IF segment is chosen by the selection of a tunable local oscillator frequency in concert with the selection of a selection from two IF bandpass filters BPF1 and BPF2 one for each IF band segment as illustrated in FIG. 5. BPF1, for example, comprises a narrow bandpass filter 100 MHz wide, while BPF2 is a relatively wide bandpass filter 2.0 GHz in bandwidth.

Considering now the details of the converters 58 and 60 of FIG. 7, the converter 58 illustrated in FIG. 8 is adapted to receive RF frequencies in the range of 2.0–18 GHz. These frequencies include the full RF range of radar, EW and CNI frequencies. A digital control unit 70 under the control of a master system controller, not shown, operates an input RF switch 72, depending upon the input frequencies of interest by way a digital control bus 73 RF input frequencies between the range of 6–8 GHz are fed from the switch 72 to a first signal path 74 including a signal amplifier 76, the output of which is coupled to a digitally controlled switch 78 also controlled by the digital control unit 70 via the bus 73. For RF input frequencies between the range of 2–6 GHz, they are fed from the switch 72 to a second signal path 80 which couples to a first IF mixer 82 by way of amplifier 84. The mixer 82 receives a fixed frequency local oscillator (LO) signal of 14 GHz from a first LO source 86. The 14 GHz LO signal is coupled to the mixer 82 through an amplifier 88. The mixer 82 effects an upconversion of the RF input to a frequency above 6 GHz as shown in FIG. 6. The output of the mixer 82 is fed to the digital switch 78 through an amplifier 90. The output of the switch 78 constitutes signals in the range of 6–18 GHz which are fed to a second mixer 92 which performs a downconversion to a range of 2.2–5.0 GHz as shown in FIG. 6. This is achieved by the inclusion of a tunable LO under the control of the digital control unit 70 coupled to the mixer 92 via an amplifier 96.

Although not shown in FIG. 6, the embodiment of FIG. 8 additionally includes a set of RF image reject filters 98 which are selectively interconnected between the switch 78 and the mixer 92 by means of a pair of digitally controlled switch elements 101 and 102 coupled on either side of the image reject filters 98 and controlled by the digital control unit 70 through the control bus 73. As shown, the image reject filters 98 are comprised of five bandpass filters having respective bandpasses of 6–8 GHz, 8–11 GHz, 11–13 GHz, 13–15 GHz and 15–18 GHz.

The output of the mixer 92 comprises IF signals ranging from 2.2 GHz to 5.0 GHz as further shown in FIG. 6. This output is next coupled to an IF bandpass network 104 including the two above-mentioned bandpass filters BPF1 and BPF2 and which are selectively connected between the output of the mixer 92 and a selected IF receiver $61_1 \ldots 62_n$ (FIG. 7) via the IF switch network 56. An amplifier 106 is also located between the mixer 92 and the bandpass filter network 106. A pair of digitally controlled switches 106 and 108 connect either the narrow band (2.2–2.3 GHz) BPF1 or the wide band (3.0–5.0 GHz) BPF2 into the circuit under the control of the digital controller 70 via the control bus 73.

Each IF receiver $62_1 \ldots 62_n$ coupled to the IF switch network 56 shown in FIG. 7 is also adapted to include identical IF bandpass filters BPF1 and BPF2 which are also connected in and out of the circuit in the same fashion by digitally controlled switches on either side of the two bandpass filters.

Accordingly, depending upon the system function being required at any one time, an appropriate IF band segment 64 or 66 (FIG. 5) is selected by controlling electronic RF switches 108 and 110 associated with the two bandpass filters BPF1 and BPF2. Given the selected IF segment and the selected RF selected to be input to the switch 72, appropriate selection of the LO frequency from the local oscillator 94 and the switches 78, 100 and 102 along with the switches 72 and 78 determines whether the 6–18 GHz path 74 or the 2–6 GHz path 80 is used.

Considering now the 0.5–2 GHz frequency converter 60 which is depicted in FIG. 9, it comprises a circuit configuration where EW and CNI signals in the range of 0.5–2.0 GHz are upconverted to an IF frequency range of 3.0 GHz–5.0 GHz by means of a single mixer 112 and a tunable local oscillator 114, providing an LO frequency of 4.5–6.0 GHz to the mixer 112 via an amplifier 116. The RF input to the mixer 112 is by way of an amplifier 118 and an RF image reject filter network 120 including three image reject filter sections for RF bands of 0.5–0.8 GHz, 0.8–1.4 GHz, and 1.4–2.0 GHz, and which are selectively connected between the amplifier 118 and the mixer 112 by a pair of digitally controlled switches 122 and 124. Switch and local oscillator commands are based on the RF to be converted and are provided by a digital controller 126 and control bus 129 which are operated in the same fashion as the controller 70 shown in FIG. 8.

An IF frequency output in the range of 3.0–5.0 GHz is outputted from the mixer 112 to the IF switch network 56 shown in FIG. 7 via an amplifier 128 and a wide bandpass (3.0–5.0 GHz) filter BPF2. A narrow bandpass filter BPF1 is not required here, since radar frequencies in the range of 6–18 GHz are not inputted to the converter 60. However, when desirable, a narrow bandpass filter may be included within the IF receiver 62 anywhere within the 30–50 GHz segment.

Figure 10:
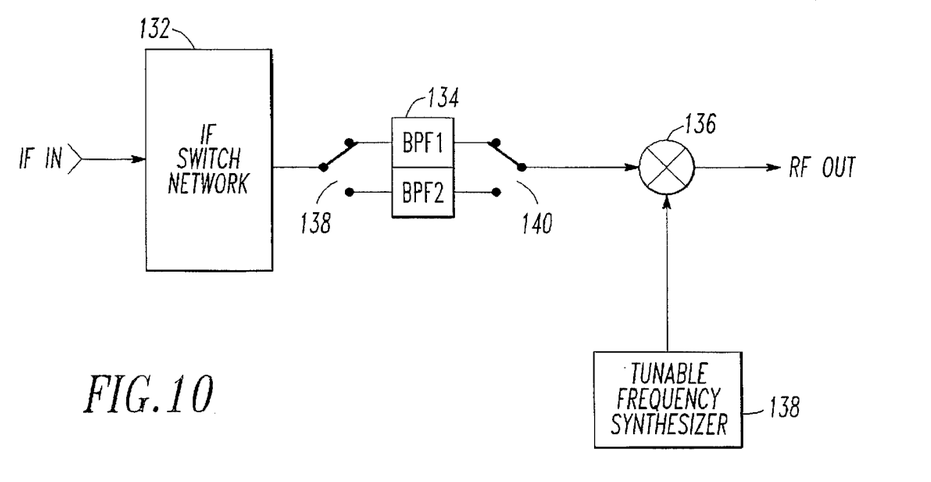
FIG. 10 is an electrical block diagram generally illustrative of the segmented IF frequency band concept used in connection with the transmission of RF frequency signals.

While the foregoing description of the invention concerns the application of segmented IF band conversion to the reception of RF signals, it should be noted that this same concept is applicable to the generation and transmission of the RF. In a reciprocal manner, as shown in FIG. 10, signals generated by common IF exciter sources, not shown, may also be output in assigned IF segments. Accordingly, IF signals in a segmented band would be selectively routed through an IF switch network 132 to a bandpass filter network 134, including two bandpass filter segments BPF1 and BPF2 (FIG. 5), one of which would be coupled to a mixer 136 via a pair of input and output switches 138 and 140. The RF output to be transmitted is generated by tunable frequency synthesizer 138. As before, bandpass segments are assigned in a manner to optimize performance of individual functions and are filtered to sufficiently reduce crosstalk among the IF interfaces.

Thus what has been shown and described, is a segmented IF band approach which achieves the goals for radar/EW/CNI RF integration while maintaining improved performance consistent with stand-alone systems.

Having thus shown and described what is at present considered to be the preferred embodiment of the invention, it should be noted the same has been made by way of illustration and not limitation. Accordingly, all modifications, alterations and changes coming within the spirit and scope of the invention are herein meant to be included.

I claim:

1. An integrated RF system for diverse type RF signals which shares hardware resources for a plurality of different functions comprising:
   a plurality of RF systems including respective antenna assemblies coupled thereto;
   a common IF interface coupled to said plurality of RF systems and having a segmented IF frequency band of at least two IF frequency bands of predetermined bandwidth separated by a guard band, said interface including an IF bandpass filter network having at least two parallel bandpass filters and being selectable in accordance with a predetermined function of said plurality of different system functions, wherein one of said bandpass filters comprises a filter having a relatively narrow bandwidth and is responsive to IF signals in a first IF frequency range and the other of said bandpass filters comprises a filter having a relatively wide bandwidth and is responsive to IF signals in a second IF frequency range, and wherein said first IF frequency range is lower frequency than said second IF frequency range, said first IF frequency range being utilized in connection with first type signals comprising high dynamic range signals and said second IF frequency range being utilized in connection with other types of RF signals requiring isolation from said first type signals, thus providing signal rejection beyond that achieved by reconfiguring switch networks alone.

2. The integrated RF system according to claim 1 wherein said other types of RF signals include electronic warfare type or other high level signals.

3. The integrated RF system according to claim 1 wherein said other types of RF signal include communication/navigation/identification type signals.

4. The integrated RF system according to claim 1 wherein said first type signals include radar signals.

5. An integrated RF system for receiving RF signals, comprising:
   a plurality of input RF systems including respective antenna assemblies coupled thereto;
   a plurality of IF receivers;
   a common IF interface coupled between said plurality of RF input systems and said plurality of IF receivers, said interface having a segmented IF frequency band of at least two IF frequency bands of predetermined bandwidth separated by a guard band, said interface further comprising,
   an RF switch network coupled to said plurality of RF systems,
   at least one IF frequency converter coupled to said RF switch network and including at least one controlled variable frequency local oscillator generating a predetermined local oscillator frequency output depending upon an RF frequency range being received,
   a first mixer having a pair of input ports and an output port, one of said input ports being coupled to said variable frequency local oscillator and the other of said input ports being coupled to an RF input signal from said RF switch network or a first IF signal generated from an RF input signal from said RF switch network;
   a bandpass filter network coupled to said output port of said first mixer, said filter network including at least two parallel bandpass filters, wherein each of said parallel bandpass filters have a respective bandwidth of one of said at least two IF frequency bands and being selectable in accordance with the RF frequency range being received, and
   an IF switch network coupled between said plurality of IF receivers and said filter network, said IF switch network being operable to selectively couple one of said bandpass filters to a designated receiver of said plurality of IF receivers.

6. The integrated RF system according to claim 5, wherein one bandwidth of said two IF frequency bands comprises a relatively narrow bandwidth for use in connection with radar type signals and the other bandwidth of said two IF frequency bands comprises a relatively wide bandwidth for use in connection with signals other than radar type signals.

7. The integrated RF system according to claim 6, wherein said filter having a relatively narrow bandwidth is responsive to IF signals in a relatively low IF frequency range and wherein said filter having a relatively wide bandwidth is responsive to IF signals in a relatively high frequency range.

8. The integrated RF system according to claim 7, wherein said at least one IF frequency converter includes a first and second signal path which are switched between said RF switch network and the other input port of said pair of input ports of said first mixer.

9. The integrated RF system according to claim 8, wherein one signal path of said first and second signal paths include means for generating said first IF signal.

10. The integrated RF system according to claim 9, wherein said means for generating said first IF signal includes a second local oscillator generating another local oscillator signal and a second mixer having a pair of input ports and an output port, one of said input ports of said second mixer being coupled to said second local oscillator, the other of said pair of input ports of said second mixer being coupled to said RF input signals by way of said RF switch network, and wherein said output port is coupled to said other input port of said first mixer.

11. The integrated RF systems according to claim 10, wherein said second mixer performs an upconversion of said RF signals and said first mixer performs a down conversion of both said RF signals and said first IF signals.

12. The integrated RF system according to claim 11, wherein said second local oscillator generates a fixed frequency output.

13. The integrated RF system according to claim 11 and additionally including first and second controlled switches respectfully coupled to input and output ends of said first and second signal paths.

14. The integrated RF system according to claim 9 and additionally including an image reject network comprising a plurality of selective image reject filters coupled between said first and second signal paths and said other input port of said first mixer.

15. The integrated RF system according to claim 6, wherein said at least one IF frequency converter comprises a first type of converter used in connection with a first range of RF frequencies, and additionally including at least one second type of IF frequency converter coupled to said RF switch network and used in connection with a second range of RF frequencies.

16. The integrated RF system according to claim 15, wherein said first range of frequencies is higher in frequency than said second range of frequencies.

17. The integrated RF system according to claim 16, wherein said second type of IF frequency converter performs an up conversion of RF signals to one of said IF frequency bands of said at least two IF frequency bands and comprising, a controlled variable frequency local oscillator having an output frequency above said second range of frequencies, a mixer having a pair of input ports and an output port, one of said input ports being coupled to said local oscillator, the other input port of said pair of input ports being coupled to RF signals of said second range of frequencies, and a bandpass filter having said wide bandwidth coupled between said output port of said mixer and said IF switch network.

18. The integrated RF system according to claim 17 and additionally including a RF image reject filter network comprised of a plurality of selective image reject filters coupled between said RF switch network and said other input port of said mixer.

\* \* \* \* \*